3,606,160
REVERSIBLE, SELF-PROPELLED
SPRINKLER SYSTEM
Harry C. Bonds, Whittier, and August C. Ringe, Pomona,
Calif., assignors to Layne & Bowler Pump Company,
La Puente, Calif.
Filed Mar. 31, 1970, Ser. No. 24,113
Int. Cl. A01g 25/02; B05b 15/06
U.S. Cl. 239—212                                  13 Claims

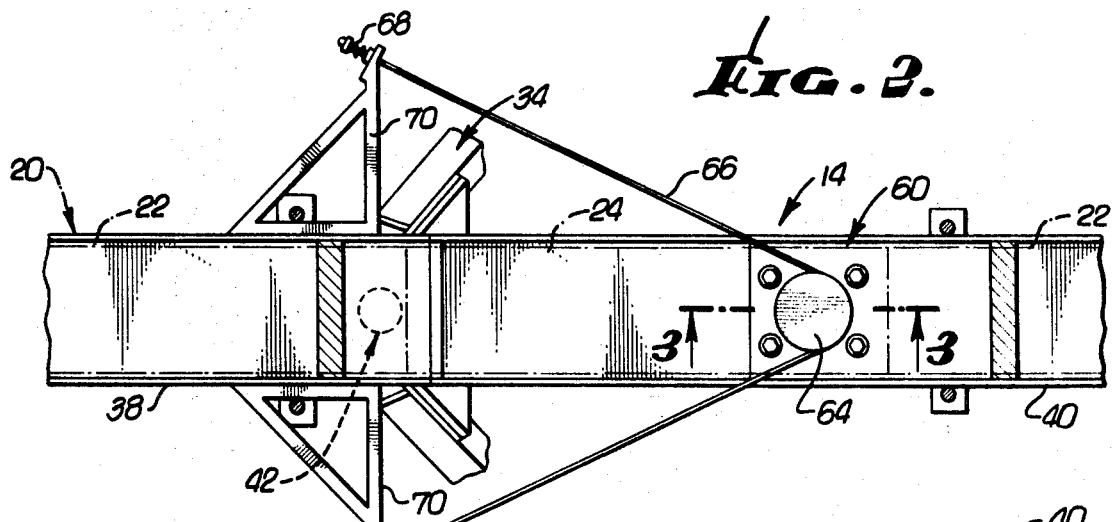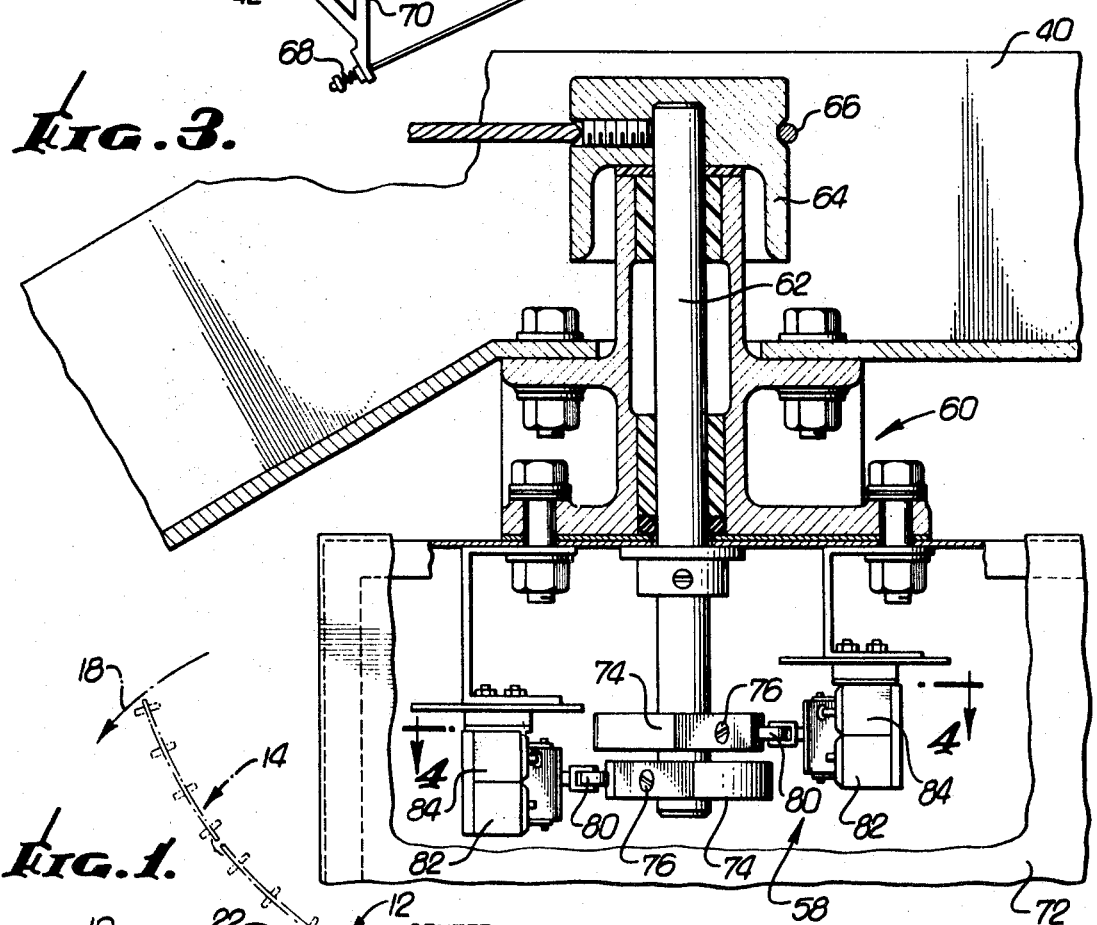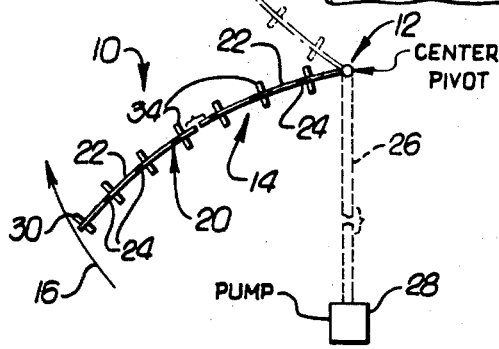

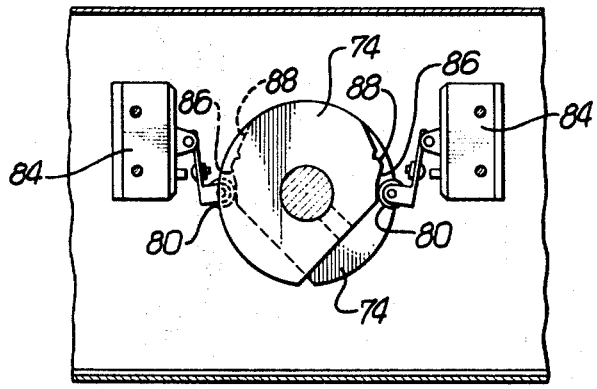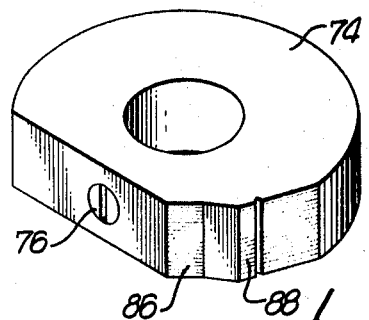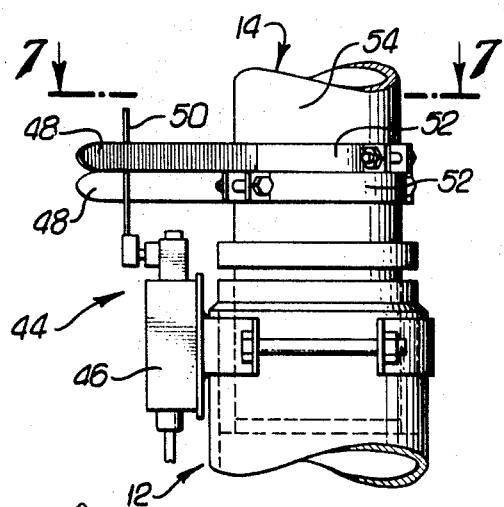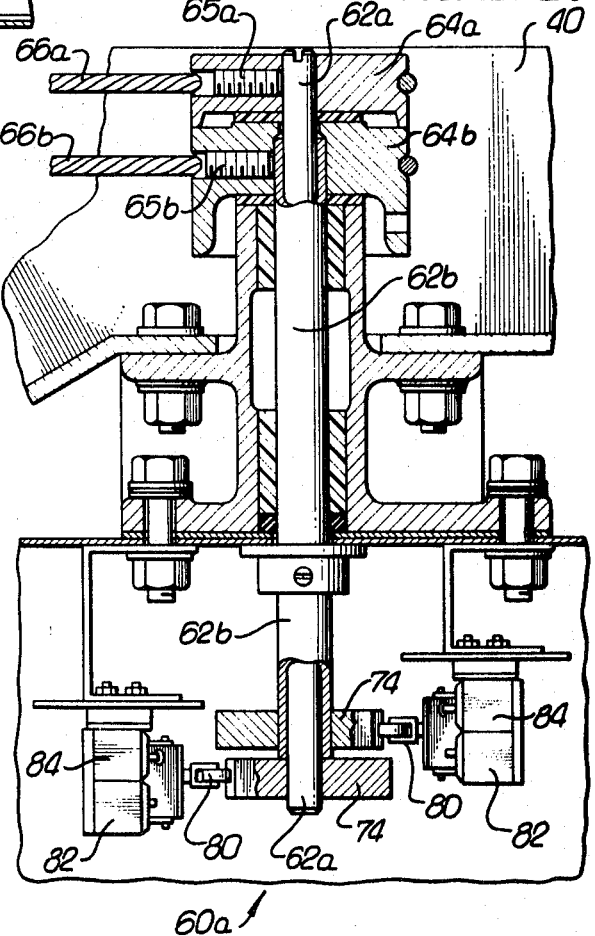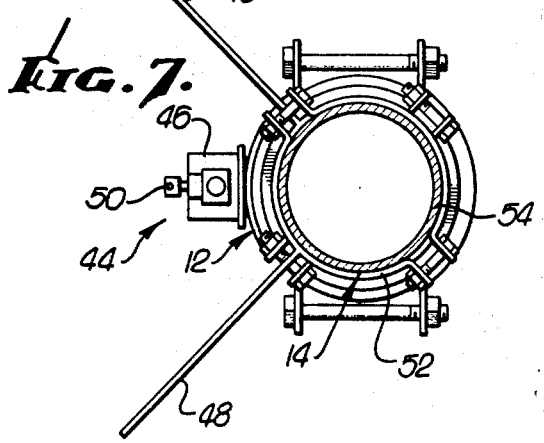

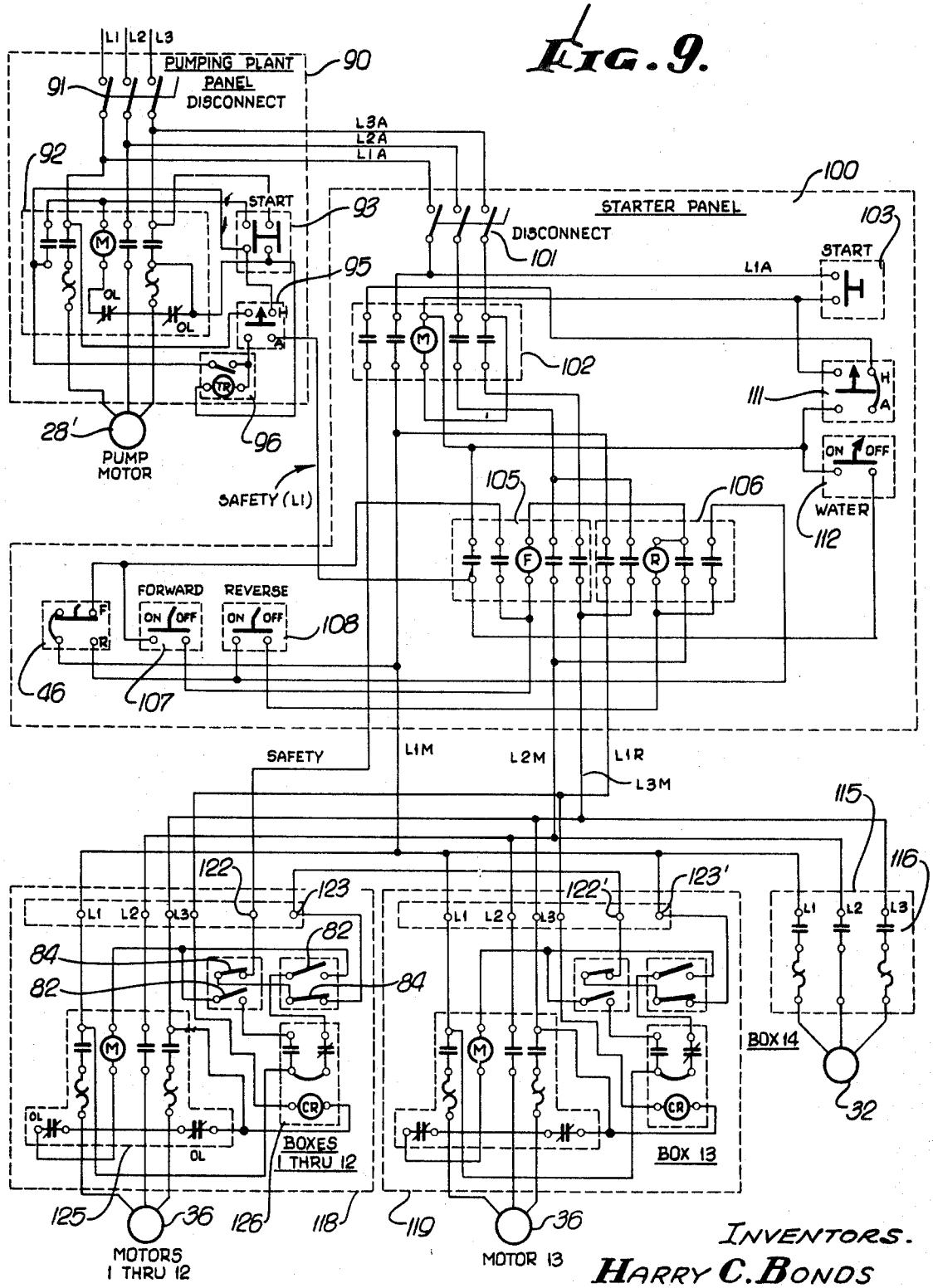

ABSTRACT OF THE DISCLOSURE

A sprinkler-type irrigation system including an elongated, self-propelled, reversible, sprinkling apparatus or structure bidirectionally moveable along an arcuate sprinkling path. The sprinkling structure comprises an elongated, sprinkler-equipped pipeline composed of a plurality of substantially aligned, interconnected pipes relatively pivotable in a generally horizontal drive plane. The sprinkling apparatus is propelled along its path by a reversible propelling means comprising a leading carriage supporting the outer end of the pipeline and driven by a reversible leading motor, and comprising a plurality of following carriages respectively supporting the pipeline at the junctions of the pipes and respectively driven by reversible following motors. A reversing means reverses the carriage drive motors upon arrival of the sprinkling structure at the end of its arcuate sprinkling path. A control means responsive to relative pivoting of the pipes in the drive plane selectively energizes the following motors as required to cause the following carriages to follow the leading carriage in either direction of movement of the sprinkling structure. The control means comprises control devices which are located at the respective junctions of the pipes and each of which includes two oppositely oriented cams and cam actuating means for pivoting the cams in opposite directions in response to relative pivoting of adjacent ones of the pipes in opposite directions in the drive plane. The carriages are maintained on a bowed line from the inner end of the pipeline to the outer end therof, in both directions of swinging movement of the sprinkling structure along the sprinkling path, with the intermediate carriages progressively farther ahead circumferentially than carriages adjacent the ends of the pipeline, whereby the pipeline operates in a bow with its convex side leading.

BACKGROUND OF INVENTION

The present invention relates in general to a sprinkler-type irrigation system for large areas and, more particularly, to an irrigation system of the type which includes a stationary structure and an elongated, self-propelled, reversible, sprinkling apparatus or structure bidirectionally moveable relative to the stationary structure along a sprinkling path, either linear or arcuate.

Sprinkler-type irrigation systems of the foregoing general nature are well known and are widely used for irrigation of large areas, particularly where the terrain is somewhat irregular and/or in the case of crops which are desirably watered from above. The length of the sprinkling structure may be as much as one-quarter mile, or more.

The irrigation system of the present invention is generally of the type disclosed in Patent No. 3,394,729, granted July 30, 1968 jointly to us and Harry C. Bonds, the principal difference being that the system of that patent is not reversible to cause the sprinkling structure to move bidirectionally along its sprinkling path. However, in view of the over-all similarities between the present invention and the irrigation system disclosed in the aforementioned patent, the latter is incorporated herein by reference to supplement the present disclosure.

More particularly, the movable sprinkling structure comprises an elongated, sprinkler-equipped pipeline composed of a plurality of substantially aligned, interconnected pipes relatively pivotable in a generally horizontal drive plane. Adjacent pipes may be interconnected at their junctions in various ways. Preferably, they are interconnected by a flexible coupling and pivot means which permit relative pivotal movement in the drive plane. However, adjacent pipes may be rigidly interconnected at their junction, in which case relative pivotal movement thereof in the drive plane takes place as the result of flexing of the pipeline.

The invention further contemplates a reversible propelling means for the moveable sprinkling apparatus comprising a leading carriage driven by a reversible leading motor and a plurality of following carriages respectively driven by reversible following motors. The pipeline is supported, preferably at one end, by the leading carriage, and is supported at the junction of the pipes by the respective following carriages.

The system includes reversing means for reversing the propelling means upon arrival of the sprinkling structure at either end of its sprinkling path, and includes control means responsive to relative pivoting of the pipes in the drive plane for selectively energizing the following motors as required to cause the following carriages to follow the leading carriage, in either direction of movement of the sprinkling structure. The control means maintains the pipeline substantially straight, irrespective of whether the sprinkling structure moves along a linear or an arcuate, sprinkling path.

SUMMARY AND OBJECTS OF INVENTION

With the foregoing as background, a primary object of the invention is to provide a sprinkler-type irrgation system of the foregoing character which includes means for maintaining all of the carriages on a bowed line from one end of the pipeline to the other, with the intermediate carriages progressvely farther ahead than the carriages adjacent the ends of the pipeline, whereby the pipeline is propelled in a bow or curve with its convex side leading. A related object is to maintain the pipeline in such a forwardly convex bow or curve in either direction of movement of the sprinkling structure along its path. Still another object in this connection is to provide a system wherein the sprinkling structure swings in such a bow or curve in either direction along an arcuate sprinkling path, the sprinkling structure in this case being pivotally connected at one end to the supporting structure for bidirectional swinging movement relative thereto in its drive plane. The principal advantage of maintaining the pipeline in the form of a bow with its convex side leading is that stresses in the pipeline are minimized, which is an important feature of the invention.

Another and important object of the invention is to provide a sprinkler-type irrigation system wherein the control means for selectively energizing the following motors, as required to cause the following carriages to follow the leading carriage with the pipeline in a forwardly-convex bow, comprises control devices which are located at the respective junctions of the pipes and each of which includes two oppositely oriented cams and cam actuating means for pivoting the cams in opposite directions in response to relative pivoting of adjacent ones of the pipes in opposite directions in the drive plane. As previously indicated, the junctions of the pipes may be of various types.

Another object of the invention is to provide a system wherein the motors are electric motors and wherein each of the control devices includes two electric switches respectively actuable by the two cams and adapted to energize the corresponding following motor in opposite directions, depending upon the direction of movement of the sprinkling structure along its path.

Another object is to provide a system wherein each control device includes two additional electric switches respectively actuable by the cams to deenergize the propelling means in the event of excessive misalignment of adjacent pipes in opposite directions in the drive plane.

Still another object of the invention is to provide a control device wherein the cam actuating means includes a shaft carrying the cams and includes means for pivoting the shaft in response to relative pivoting of the associated pipes. A related object is to provide means adjustably connecting the cams to the shaft for independent angular adjustments of the cams relative to the shaft to adjust the responses of the cams to relative pivoting of the corresponding pipes.

Another object of the invention is to provide a cam actuating means which includes two relatively pivotable, concentric shafts respectively carrying the cams, and includes two cam actuators respectively connected to the shafts and pivotable in unison in response to relative pivoting of the corresponding pipes. Another object in this connection is to provide means adjustably connecting the cam actuators to the shafts for independent angular adjustments of the cam actuators relative to the shafts to adjust the responses of the cams to relative pivoting of the related pipes.

Still another object of the invention is to provide an irrigation system wherein the reversing means comprises a reversing device on one of the stationary and sprinkling structures and two spaced stops on the other and respectively engageable with the reversing device to actuate same at the ends of the sprinkling path, the stops being adjustable to vary the extent of, and the positions of the respective ends of, the sprinkling path.

The foregoing objects, advantages, features and results of the present invention, together with various other objects, advantages, features and results thereof which will be evident to those skilled in the irrigation system art in the light of this disclosure, may be achieved with the exemplary embodiments of the invention described in detail hereinafter and illustrated in the accompanying drawings.

DESCRIPTION OF DRAWINGS

In the drawings:

FIG. 1 is a semidiagrammatic plan view of a reversible sprinkler-type irrigation system which embodies the invention;

FIG. 2 is a fragmentary plan view of an intermediate portion of an elongated, self-propelled, reversible, sprinkling apparatus or structure forming part of the irrigation system;

FIG. 3 is an enlarged, fragmentary, vertical sectional view taken as indicated by the arrowed line 3—3 of FIG. 2;

FIG. 4 is a fragmentary, horizontal sectional view taken as indicated by the arrowed line 4—4 of FIG. 3;

FIG. 5 is an enlarged isometric view of a cam forming part of a control means of the irrigation system;

FIG. 6 is a fragmentary elevational view of a portion of a stationary structure relative to which the sprinkling structure is bidirectionally swingable, a portion of the swingable apparatus being shown also;

FIG. 7 is a horizontal sectional view taken as indicated by the arrowed line 7—7 of FIG. 6;

FIG. 8 is a view similar to FIG. 3, but showing an alternative embodiment; and

FIG. 9 is an electrical schematic of the irrigation system of the invention.

DETAILED DESCRIPTION OF EXEMPLARY EMBODIMENTS OF INVENTION

Referring initially to FIG. 1 of the drawings, semidiagrammatically illustrated therein is a sprinkler-type irrigation system 10 of the invention which includes a stationary structure 12 and an elongated, self-propelled, reversible, sprinkling apparatus or structure 14 bidirectionally moveable in a generally horizontal drive plane relative to the stationary structure along a sprinkling path, as indicated by the arrows 16 and 18. In the particular embodiment illustrated, the sprinkling structure 14 is pivotally connected at one end to the stationary structure 12 for bidirectional swinging movement relative thereto in the drive plane. It will be understood, however, that the invention is equally applicable to a linearly moveable sprinkling structure, not shown, as well as to a swingable one.

The sprinkling structure 14 comprises an elongated, sprinkler-equipped pipeline 20 composed of a plurality of substantially aligned, interconnected pipes 22 relatively pivotable in the drive plane. The pipes 22 are shown in FIG. 1 as interconnected by flexible couplings 24. However, the pipes 22 may be rigidly interconnected, as by welding.

In the latter event, the pipeline 20, because of its length, is capable of flexing sufficiently at the junctions of the pipes 22 to provide the mode of operation hereinafter discussed.

The inner end of the pipeline 20 is suitably pivotally connected to the stationary structure 12 for swinging movement in the drive plane, and is supplied with water through a pipeline 26 having connected thereto a pump 28, or other suitable source.

The pipeline 20 is supported and bidirectionally propelled by a reversible propelling means which includes a leading carriage 30 driven by a reversible leading motor 32, FIG. 9, and which includes a plurality of following carriages 34 respectively driven by reversible following motors 36, FIG. 9. The leading carriage 30 supports the outer end of the pipeline 20, while the following carriages 34 support the pipeline at the respective junctions of the pipes 22.

More particularly, as shown in FIG. 2, adjacent pipes 22 interconnected by one of the flexible couplings 24 are carried by frames 38 and 40 interconnected by a universal joint 42 which permits relative pivoting of the frames 38 and 40, and the corresponding pipes 22, in the drive plane. Although the irrigation system 10 specifically provides for relative pivoting of adjacent pipes 22 by the inclusion of the associated flexible coupling 24 and the corresponding universal joint 42, it will be understood that relative pivoting of the pipes 22 in the drive plane at their junctions may be provided for in other ways, as by relying on the inherent flexibility of the elongated pipeline 20.

As previously indicated, the following carriages 34 support the pipeline 20 at the respective junctions of the pipes 22. One of the following carriages 34 is shown fragmentarily in FIG. 2 of the drawings as supporting the corresponding pipe frame 40.

Much of the foregoing construction of the sprinkling structure 14 is disclosed in considerably more detail in the aforementioned patent. Consequently, reference is made thereto for a more detailed disclosure if one is desired.

The reversible propelling means for the sprinkling structure 14, comprising the leading carriage and its drive motor 32 and the following carriages 34 and their drive motors 36, is reversible, upon arrival of the sprinkling structure at the ends of the sprinkling path, by a reversing means 44. The latter is shown in FIGS. 6 and 7 as comprising a reversing device or switch 46 mounted on the stationary structure 12 and as comprising two angularly spaced stops 48 mounted on and moveable with the sprinkling structure 14 and respectively engageable with the reversing switch at the ends of the sprinkling path to actuate the reversing switch. The manner in which the reversing switch 46, when actuated by one of the stops 48, reverses the carriage drive motors 32 and 36 will be discussed hereinafter in connection with FIG. 9 of the drawings.

Considering the reversing means 44 more particularly, the reversing switch 46 is provided with an actuating wand 50 which is disposed between the two stops 48, the latter projecting radially outwardly from the pixot axis of the sprinkling structure 14 on opposite sides of the wand. The two stops 48 are independently angularly adjustable relative to the sprinkling structure 14 to vary the angular extent of, and the angular positions of the respective ends of, the sprinkling path negotiated by the sprinkling structure. Specifically, each stop 48 is shown as mounted on one half of a split clamp 52 which is clamped onto a vertical tubular portion 54 of the sprinkling structure 14, it being understood that the tubular portion 54 may conduct water to the inner end of the pipeline 20.

With the foregoing construction, the stops 48 may be positioned angularly as required to adjust the angular limits of the sprinkling path. Thus, the angular movement of the sprinkling structure 14 in either direction may be terminated short of some obstruction requiring reversal of its direction of movement, such as a property line, terrain too precipitous to negotiate, or the like.

As also disclosed in more detail in our earlier patent, the irrigation system 10 includes control means 58 responsive to relative pivoting of the pipes 22 in the drive plane for selectively energizing the following motors 36 as required to cause the following carriages 34 to follow the leading carriage 30. In other words, the control means 58 selectively energizes the following motors 36 as required to cause the following carriages 34 to maintain predetermined positions relative to the leading carriage 30 and relative to each other, as will be discussed in more detail hereinafter.

The control means 58 comprises control devices 60 at the respective junctions of the pipes 22. As best shown in FIGS. 2 and 3 of the drawings, each control device 60 comprises an upright shaft 62 carried by the corresponding pipe frame 40 and pivotable relative thereto about its axis. The shaft 62 has secured to the upper end thereof a pulleylike cam actuator 64 having a cam actuating cable 66 trained therearound. The ends of the cable 66 are resiliently connected, through compression springs 68, to brackets 70 on the associated pipe frame 38. It will be apparent that, with this construction, relative pivoting of the corresponding pipes 22 in the drive plane causes the cable 66 to pivot the shaft 62 corespondingly, irrespective of the direction of relative pivoting of the two pipes in the drive plane.

The shaft 62 extends downwardly into a control box 72 associated with the corresponding following carriage 34. The shaft 62 has fixed thereon within the control box 72 two oppositely oriented control cams 74 the angular positions of which on the shaft are fixed by set screws 76 permitting adjustment of the angular positions of the cams to provide the desired positional relationships of the following carriages 34 relative to the leading carriage 30 and relative to each other in either direction of travel of the sprinkling structure 14, as will be discussed in more detail hereinafter.

The two cams 74 of each control device 60 respectively control the corresponding following motor 36 during movement of the sprinkling structure 14 along its path in opposite directions. In other words, one of the cams 74 controls the corresponding following motor 36 during movement of the sprinkling structure 14 in the direction of the arrow 16 of FIG. 1, and the other cam 74 controls the corresponding following motor during movement of the sprinkling structure in the opposite direction, as indicated by the arrow 18.

Respectively engaging the cams 74 are cam followers 80 each connected to a control switch 82 and a safety switch 84 mechanically ganged together in the manner disclosed in the aforementioned patent.

The control switches 82 respectively regulate the operation of the corresponding following motor 36 during movement of the sprinkling structure 14 in opposite directions. V-shaped portions 86 of the cams 74, which V-shaped portions are substantially flat, operate the control switches 82 through the cam followers 80. Each control switch 82 is normally open and is closed by the corresponding cam portion 86, during movement of the sprinkling structure 14 in the corresponding direction, as the result of relative pivoting of the adjacent pipes 22 in the drive plane caused by lagging of the associated following carriage 34 behind its desired position. Such closure of either control switch 82 results in energization of the corresponding following motor 36 until such time as the associated following carriage 34 has caught up, whereupon the angular misalignment of the adjacent pipes 22 which caused closure of the control switch 82 in question is eliminated. The particular following motor 36 under consideration then remains deenergized until it is necessary for it to cause its carriage 34 to catch up once again. This mode of operation is discussed in detail in our aforementioned patent so that a further discussion herein is unnecessary.

The two cams 74 are provided with flat portions 88 which are engaged by the cam followers 80 in response to excessive relative pivoting of the adjacent pipes 22 during movement of the sprinkling structure 14 in opposite directions. The safety switches 84 are normally closed so that, if excessive relative pivoting of the pipes 22 occurs during movement of the sprinkling structure 14 in either direction, the corresponding safety switch is opened by the corresponding cam portion 88 acting on the associated cam follower 80. As shown in FIG. 9 of the drawings, and as discussed hereinafter, this results in deenergizing the entire propelling means for the sprinkling structure 14 until such time as the excessive misalignment at one of the following carriages 34 is corrected. Again, attention is directed to our earlier patent for a more detailed discussion of the purpose, function and mode of operation of such safety switch.

As will be apparent, angular adjustments of the cams 74 relative to the cam followers 80 require access to the control box 72. FIG. 8 of the drawings illustrates an alternative control device 60a which permits angular adjustments of the cams 74 from the exterior of the control box. In this case, the cams 74, instead of being adjustably mounted on the shaft 62, are permanently mounted on concentric shafts 62a and 62b which are pivotable relative to each other about their common axis. The single cam actuator 64 is replaced by two cam actuators 64a and 64b respectively adjustably secured to the shafts 62a and 62b by set screws 65a and 65b. Instead of the single cam actuating cable 66, the brackets 70 have resiliently connected thereto two cables 66a and 66b respectively trained around the cam actuators 64a and 64b. With this construction, the cables 66a and 66b rotate the cams 74 in unison as in the previous embodiment. However, if angular adjustments of the cams 74 are required, this may be accomplished from the exterior by loosening one or both of the set screws 65a and 65b, making the necessary adjustments, and retightening these set screws. In all other respects, the control device 60a is identical to the control device 60.

An important feature of the invention is that the control cams 74 of the control devices 60 or 60a are so adjusted angularly of their shafts that, as shown in FIG. 1 of the drawings, the leading carriage and the following carriages 34 are maintained on a bowed line from the inner end of the pipeline 20 to the outer end thereof, in both directions 16 and 18 of swinging movement of the sprinkling structure 14 along the sprinkling path, with the radially intermediate carriages progressively farther ahead circumferentially than the carriages adjacent the ends of the pipeline. Thus, the pipeline 20 is propelled in a bow with its convex side leading, as shown in FIG. 1, which is an important feature of the invention since it minimizes stresses in the pipeline.

General operation

Considering the general operation of the irrigation system 10 of the invention as thus far described, it will be apparent that the sprinkling structure 14 will swing back and forth along its arcuate sprinkling path, the direction of movement being reversed by the reversing means 44 at each end of the sprinkling path as the corresponding stop 48 engages the reversing switch 46. As previously explained, the stops 48 are angularly adjustable to vary the angular extent of the sprinkling path and/or the angular positions of the respective ends thereof.

As the sprinkling structure 14 makes each swing from either end of its sprinkling path to the other, the leading motor 32 is energized continuously to act as a pacemaker. The following motors 36 are intermittently energized as required to maintain the prescribed positions of the following carriages 34 relative to the leading carriage 30 and relative to each other, which prescribed positions are such as to maintain the pipeline 20 in a forwardly-convex bow in either direction of movement. As previously explained, for a given direction of movement of the sprinkling structure 14, each control cam 74 of the corresponding set turns its control switch 82 on to energize the corresponding following motor 36 in response to a predetermined relative angular pivoting of the adjacent pipes 22 in the drive plane. Thus, the following motors 36 are normally deenergized, each being energized only when the corresponding following carriage 34 lags behind its prescribed position. In the event that one of the following carriages 34 lags excessively, the corresponding safety switch 84 turns off the entire system 10 until such excessive misalignment is corrected.

Electrical system

The electrical system of the irrigation apparatus 10 of the invention, including the motors 32 and 36 and the switches 46, 82, and 84 forming parts thereof, will now be considered in connection with FIG. 9 of the drawing.

FIG. 9 is a schematic diagram of the electrical system for a sprinkling apparatus 14 with fourteen drive carriages. Three phase A.C. electric power is provided on L1, L2 and L3 at the pumping plant control panel 90. A manual disconnect switch 91 provides for manually turning the power on and off. The water pump 28 is driven by a pump motor 28′ which is energized through a conventional motor starter 92. The magnetic coil M of the starter 92 is energized by a manually operated start switch 93 to close the four sets of contacts of the starter. The starter 92 includes conventional thermal overload protection for opening the contact sets OL when the preset load limits are exceeded.

A switch 95 is included in the pumping plant panel 90 and has two positions indicated as H and A. When switch 95 is manually moved to the H position, the pump motor 28′ may be turned on by actuating the start button 93, without energizing any other portion of the system. When switch 95 is moved to the A position, the system is in the automatic mode of operation. The safety (L1) line is connected through the A side of the switch 95 to a time delay relay 96 which provides for automatically shutting off power to the pump motor a predetermined time after opening of the safety line. With this mode of operation, the pump motor 28′ is shut off after the entire system has been shut off by safety operation, and thereby prevents continuous sprinkling in one location and subsequent flooding.

Three phase A.C. power is run to the starter panel 100 on lines L1a, L2a and L3a and a manually operated disconnect switch 101 provides for controlling power to the starter panel. A conventional motor starter 102 is controlled by manually operated start button 103, connecting line L1a to each of the carriages via line L1m and connecting lines L2a and L3a to the carriages through forward motor starter 105 and a reverse motor starter 106.

The forward and reverse starters 105, 106 are controlled by the reversing switch 46 and by manually controlled switches 107 and 108. If the system is to run only in the forward direction, switch 107 is manually closed. If the system is to run only in the reverse direction, switch 108 is manually closed. If the system is to run both forward and reverse, both switches 107 and 108 are closed.

Manually operated switch 111 provides for manual and automatic operation of the carriage motors. When switch 111 is in the H position, the carriage motors may be energized by manually depressing the starter switch 103. When switch 111 is in the A position, the system operation is automatic after being started by actuating the start switch 103. Switch 112 provides for manual selection of water, that is, the system can be operated with the sprinklers on and pump motor 28′ running or can be operated with the sprinklers off and pump motor 28′ unenergized.

The particular system illustrated in FIG. 9 provides for fourteen carriages, with control box 115 on the end or fourteenth carriage. The leading motor 32 may be turned on and off by a manually operated switch 116 with conventional thermal overload protection. The carriage drive motors 32, 36 typically are three phase induction motors which run at substantially contant speed. The speed of the leading carriage typically is controlled by a manually adjustable mechanical speed changer between the motor 32 and the wheels or endless belt.

A control box like control box 118 is provided for each of the carriages one through twelve and control box 119 is provided for the thirteenth carriage. The control boxes 118 and 119 are identical and the installation differs only in the routing of the safety line which may be traced as follows. Starting at point 122, the safety line goes through the first safety switch 84 and then through the second safety switch 84 to point 123. Point 123 of box 1 will be connected to point 122 of box 2 and so on to box 13. Point 123 of box 12 will be connected to point 122 of box 13, with point 123 of box 13 connected back to line L1m. This circuit places both safety switches of each of the thirteen control boxes in series.

The two control switches 82 are selectively connected between line L1 and the magnet M of the starter 125 by a control relay 126. The solenoid CR of the control relay 126 is energized via line L1R. When the solenoid CR is unenergized, the right hand contact set of the relay 126 is closed and the right hand control switch 82 is operative. When the solenoid CR is energized, the left hand contact set of relay 126 is closed and the left hand control switch 82 is operative. The solenoids CR of each control relay are energized via line L1R when the reverse starter 106 is energized. The starters 125 for each of the following motors 36 are similar to the starter 92 for the pump motor 28′.

In normal operating condition, the switches 95 and 111 are moved to the A or automatic position, the forward and reverse switches 107 and 108 are turned on, and the water switch 112 is turned on. The reversing switch 46 is initially set in the F or forward position as shown in FIG. 9. The start switch 103 may then be depressed to start the system. Starter 102 will be energized and forward starter 105 will be energized, providing power to the leading motor 32 and providing power to the boxes for the thirteen following motors. All of the control relays 126 will be unenergized and individual following motors 36 will be turned on when the right hand or forward control switch 82 is closed by the cam action described previously.

The pump motor 28 may be turned on by operating start switch 93. The system now runs in the forward direction until the reversing switch 46 is actuated, moving the switch from the forward or F position to the reverse or R position. This switch operation deenergizes forward starter 105 and energizes reverse starter 106. This produces a reversal in connection of power lines L2 and L3 and also provides power on line L1R for energizing the control relays 126.

Reversal of power on the lines L2 and L3 causes the motors 32 and 36 to run in the opposite direction when energized. As described previously, energizing the control relays 126 takes the forward or right hand control switches out of operation and places the reverse or left hand control switches in operation.

The system then moves in the reverse direction until the reversing switch 46 is again actuated to deenergize reverse starter 106 and energize forward starter 105. This operation will continue until the system is turned off as by opening switches 107 and 108.

Although exemplary embodiments of the invention have been disclosed herein for purposes of illustration, it will be understood that various changes, modifications and substitutions may be incorporated in such embodiments without departing from the invention as defined by the claims appearing in the next section of this specification.

We claim as our invention:

1. In a sprinkler-type irrigation system for large areas, the combination of:
   (a) a stationary structure;
   (b) an elongated, self-propelled, reversible, sprinkling structure bidirectionally movable relative to said stationary structure along a sprinkling path;
   (c) said sprinkling structure comprising an elongated, sprinkler-equipped pipeline composed of a plurality of substantially aligned, interconnected pipes relatively pivotable in a generally horizontal drive plane;
   (d) reversible propelling means for said sprinkling structure comprising a leading carriage driven by a reversible leading motor and a plurality of following carriages respectively driven by reversible following motors;
   (e) said pipeline being supported at one point by said leading carriage and being supported at the junctions of said pipes by said following carriages, respectively;
   (f) reversing means on said stationary and sprinkling structures for reversing said propelling means upon arrival of said sprinkling structure at the ends of said sprinkling path;
   (g) control means responsive to relative pivoting of said pipes in said drive plane for selectively energizing said following motors as required to cause said following carriages to follow said leading carriage, in either direction of movement of said sprinkling structure; and
   (h) said control means comprising control devices at the respective junctions of said pipes, each of said control devices including two oppositely oriented cams and cam actuating means for pivoting said cams in opposite directions in response to relative pivoting of adjacent ones of said pipes in opposite directions in said drive plane.

2. An irrigation system as defined in claim 1 wherein said sprinkling structure is pivotally connected at one end to said stationary structure for bidirectional swinging movement relative thereto in said drive plane, and is supported at its other end by said leading carriage.

3. An irrigation system as defined in claim 1 wherein said following motors are electric motors and wherein each of said control devices includes two electric switches respectively actuable by said cams and adapted to energize the corresponding following motor in opposite directions.

4. An irrigation system as set forth in claim 3 wherein each of said control devices includes two additional electric switches respectively actuable by said cams to deenergize said propelling means in the event of excessive relative pivoting of the adjacent ones of said pipes in opposite directions in said drive plane.

5. An irrigation system according to claim 1 wherein said cam actuating means of each of said control devices includes a shaft carrying said cams and includes means for pivoting said shaft.

6. An irrigation system as defined in claim 5 wherein each of said cam actuating means includes means adjustably connecting said cams to said shaft for independent angular adjustments of said cams relative to said shaft.

7. An irrigation system as set forth in claim 1 wherein each of said cam actuating means includes two relatively pivotable, concentric shafts respectively carrying said cams, includes two cam actuators respectively connected to said shafts, and includes means for pivoting said cam actuators in unison.

8. An irrigation system according to claim 7 wherein each of said cam actuating means includes means adjustably connecting said cam actuators to said shafts, respectively, for independent angular adjustments of said cam actuators relative to said shafts.

9. An irrigation system according to claim 1 wherein said reversing means comprises a reversing device on one of said structures and two spaced stops on the other and respectively engageable with said reversing device to actuate same at the ends of said sprinkling path.

10. An irrigation system as defined in claim 2 wherein said reversing means comprises a reversing device carried by said stationary structure and said stops are carried by said sprinkling structure.

11. An irrigation system as set forth in claim 10 wherein said stops are independently angularly adjustable relative to said sprinkling structure to vary the angular extent of and the angular positions of the respective ends of said sprinkling path.

12. An irrigation system as defined in claim 2 including means for maintaining said carriages on a bowed line from the inner end of said pipeline to the outer end thereof, in both directions of swinging movement of said sprinkling structure along said sprinkling path, with the intermediate carriages progressively farther ahead circumferentially than the carriages adjacent the ends of said pipeline, whereby said pipeline is propelled in a bow with its convex side leading.

13. In a sprinkler-type irrigation system for large areas, the combination of:
   (a) a stationary structure;
   (b) an elongated, self-propelled, sprinkling structure pivotally connected at one end to said stationary structure for movement along an arcuate sprinkling path;
   (c) said sprinkling structure comprising an elongated, sprinkler-equipped pipeline composed of a plurality of substantially aligned, interconnected pipes relatively pivotable in a generally horizontal drive plane;
   (d) propelling means for said sprinkling structure comprising a leading carriage driven by a leading motor and a plurality of following carriages respectively driven by following motors;
   (e) said pipeline being supported at its outer end by said leading carriage and being supported at the junction of said pipes by said following carriages, respectively;
   (f) control means responsive to relative pivoting of said pipes in said drive plane for selectively energizing said following motors as required to cause said following carriages to follow said leading carriage, in either direction of movement of said sprinkling structure; and
   (g) means for maintaining said carriages on a bowed line from the inner end of said pipeline to the outer end thereof with the intermediate carriages progressively farther ahead circumferentially than the carriages adjacent the ends of said pipeline, whereby said pipeline is propelled in a bow with its convex side leading.

References Cited

UNITED STATES PATENTS

| | | | |
|---|---|---|---|
| 3,342,417 | 9/1967 | Dowd | 239—212X |
| 3,381,894 | 5/1968 | Purtell | 239—212X |
| 3,394,729 | 7/1968 | Bower et al. | 239—212X |
| 3,447,751 | 6/1969 | Wieck | 239—212 |

LLOYD L. KING, Primary Examiner

U.S. Cl. X.R.

137—344